United States Patent [19]

Harper et al.

[11] Patent Number: 5,453,320
[45] Date of Patent: Sep. 26, 1995

[54] PAVEMENT MARKING MATERIAL

[75] Inventors: James H. C. Harper; Gary R. Miron; Timothy D. Bredhal, all of St. Paul, Minn.

[73] Assignee: Minnesota Mining and Manufacturing Company, St. Paul, Minn.

[21] Appl. No.: 153,714

[22] Filed: Nov. 16, 1993

Related U.S. Application Data

[63] Continuation of Ser. No. 875,528, Apr. 27, 1992, abandoned, which is a continuation of Ser. No. 606,959, Oct. 31, 1990, abandoned.

[51] Int. Cl.$^6$ .............................. B32B 5/16; B32B 25/16
[52] U.S. Cl. .............. 428/356; 428/212; 428/353; 428/354; 428/355; 428/492; 404/12; 404/14; 404/20; 404/94; 522/110; 525/98
[58] Field of Search .................... 428/356, 355, 428/354, 353, 492, 345, 212; 404/12, 14, 19, 20, 94; 522/110; 525/98

[56] References Cited

U.S. PATENT DOCUMENTS

| | | | |
|---|---|---|---|
| 2,956,904 | 10/1960 | Hendricks | 117/93 |
| 3,587,415 | 6/1971 | Eigenmann | 94/1.5 |
| 3,902,939 | 9/1975 | Eigenmann | 156/71 |
| 3,935,365 | 1/1976 | Eigenmann | 428/323 |
| 4,082,587 | 4/1978 | Eigenmann | 156/71 |
| 4,146,635 | 3/1979 | Eigenmann | 428/283 |
| 4,147,831 | 3/1979 | Balinth | 428/356 |
| 4,151,057 | 4/1979 | St. Clair et al. | 204/159.17 |
| 4,248,932 | 2/1981 | Tung et al. | 428/325 |
| 4,299,874 | 11/1981 | Jones et al. | 428/143 |
| 4,478,912 | 10/1984 | Uffner et al. | 428/349 |
| 4,556,464 | 12/1985 | St. Clair | 204/159.15 |
| 4,581,281 | 4/1986 | Gerace | 428/215 |
| 4,648,689 | 3/1987 | May | 350/105 |
| 4,652,491 | 3/1987 | Gobran | 428/355 |
| 4,906,523 | 3/1990 | Bilkadi et al. | 428/327 |
| 4,948,825 | 8/1990 | Sasaki | 524/274 |
| 5,051,296 | 9/1991 | Agarwal et al. | 428/213 |
| 5,077,117 | 12/1991 | Harper et al. | 428/143 |
| 5,087,148 | 2/1992 | Wyckoff | 404/12 |
| 5,112,889 | 5/1992 | Miller et al. | 524/77 |

FOREIGN PATENT DOCUMENTS 2634802 2/1990 France.

OTHER PUBLICATIONS

Pressure Sensitive Tape Council Test Method, PSTC–6, "Tack Rolling Ball," pp. 29–30.
Pressure Sensitive Tape Council Test Method, PSTC–7, "Holding Power of Pressure–Sensitive Tape," pp. 31–33.
*The Handbook of Adhesives*, 2d Ed., Irving Skeist ed., Van Nostrand Reinhold Company, 1977, pp. 403–411.

*Primary Examiner*—George F. Lesmes
*Assistant Examiner*—Blaine Copenheaver
*Attorney, Agent, or Firm*—Gary L. Griswold; Walter N. Kirn; Robert H. Jordan

[57] ABSTRACT

Pavement marking material comprising a top layer, an optional base sheet, and a layer of adhesive, wherein the adhesive comprises a rubber and a high loading of tackifier. Such adhesives have been found to exhibit exceptional impact shear resistance.

11 Claims, 1 Drawing Sheet

PAVEMENT MARKING MATERIAL

CROSS-REFERENCE TO RELATED APPLICATIONS

This application is a continuation of U.S. application Ser. No. 07/875,528, filed Apr. 27, 1992, now abandoned, which is a continuation of U.S. application Ser. No. 07/606,959, filed Oct. 31, 1990, now abandoned.

FIELD OF INVENTION

The present invention relates to a pavement marking material which may be adhered to a roadway to provide traffic control markings and the like.

BACKGROUND

Preformed pavement marking materials are used as traffic control markings for a variety of uses, such as short distance lane striping, stop bars, and pedestrian lane markings at cross walks and lane and shoulder delineators and skips on highways. Typically, preformed pavement marking materials comprise a continuous, preferably wear-resistant top layer overlying a flexible base sheet. Such marking materials are typically applied to road surfaces using pressure-sensitive adhesives or contact cement.

Pavement markings such as markings for crosswalks, stop bars, etc. at intersections, sometimes referred to as "transverse applications", are subjected to very high, very quick shear forces from vehicles which start, stop, and turn at the location. The shear stresses encountered in transverse applications are typically substantially greater than the shear forces typically encountered due to traffic in "long line" or "longitudinal applications" such as lane and shoulder delineators and skips on highways. The adhesives on many markings do not provide desired shear resistance to achieve satisfactory performance in transverse applications.

U.S. Pat. No. 3,902,939 (Eigenmann) discloses a pavement marking tape material which utilizes an adhesive which is not tacky at room temperature but which is activated by a hot primer layer or solvent to provide adhesion to pavement surfaces.

U.S. Pat. No. 4,146,635 (Eigenmann) discloses a road marking tape material designed to better withstand tangential stresses internally by incorporation of an inextensible, tensionally resistant intermediate layer.

U.S. Pat. No. 2,956,904 (Hendricks) discloses use of high energy electron ("e-beam") bombardment of rubber resin type pressure-sensitive adhesives to increase the cohesive properties of the adhesives.

SUMMARY OF INVENTION

The present invention provides an improved pavement marking material which comprises a top layer, optionally a flexible base sheet, and a layer of adhesive. Once applied to road surfaces, pavement marking materials of the invention exhibit exceptional impact shear resistance, thereby providing improved durability and safety.

Briefly summarizing, the adhesive layer of marking materials of the invention comprises a hereinafter described hydrocarbon-based elastomer and large amount of hereinafter described tackifier, e.g., between about 125 and about 225 parts by weight of tackifier per 100 parts by weight of elastomer, i.e., between about 125 and about 225 phr of tackifier.

It is generally well known to those skilled in the art of formulating pressure-sensitive adhesives that increasing the level of tackifying resin in a rubber-resin mixture results in compositions with decreased static shear strength. Surprisingly we have found that increasing the amount of tackifier in a rubber-resin pressure-sensitive adhesive to unusually high levels, i.e., about 125 to about 225 phr, results in adhesives which exhibit improved resistance to impact-like shear forces such as are encountered in transverse lane marking applications.

Pavement marking materials of the invention are particularly well suited for use to mark crosswalks, stop bars, etc. at intersections, i.e., transverse applications. Pavement marking materials of the invention are also well suited for use in longitudinal applications, e.g., lane and shoulder delineators and skips, and may be used on a variety of pavement surfaces, e.g., concrete and asphalt.

BRIEF DESCRIPTION OF DRAWING

The invention will be further explained with reference to the drawing, wherein.

DETAILED DESCRIPTION OF ILLUSTRATIVE EMBODIMENTS

Figure 1:
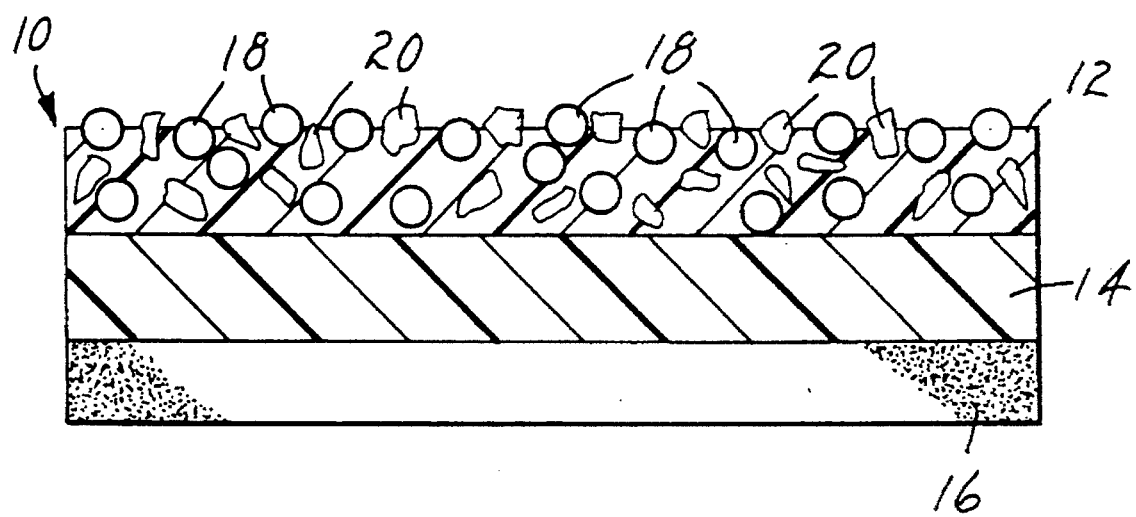
FIG. 1 is a cross-sectional view of a portion of an illustrative embodiment of pavement marking material of the invention. This figure, which is idealized, is not to scale and is intended to be merely illustrative and non-limiting.

As shown in FIG. 1, in a typical embodiment of the invention, pavement marking material 10 comprises top layer 12, optional base sheet 14, and adhesive layer 16 which adheres marking material 10 to a substrate such as the pavement surface of a roadway (not shown).

Adhesive layer 16 comprises rubber and tackifier.

Rubbers used herein include those having a low glass transition temperature, i.e., a $T_g$ of between about −120° C. and about −50° C. Illustrative examples of suitable elastomers include the following: natural rubber, polyisoprene, polybutadiene, styrene butadiene, polyisobutylene, butyl rubber, and A-B-A block copolymers wherein B represents a rubbery midblock having a $T_g$ within the indicated range, e.g., polyisoprene, polybutadiene, or poly(ethylene/butylene), and A represents a thermoplastic polystyrene end block. These may be used singly or in combination.

In an illustrative embodiment, adhesives of the invention may comprise a blend of rubbers, e.g., between about 60 and about 100 weight percent of polybutadiene rubber and up to about 40 weight percent of styrene butadiene rubber. In such embodiments, the styrene butadiene is believed to reinforce the polybutadiene which typically has a very low $T_g$ and may be somewhat soft or weak.

Tackifiers used in the present invention should be compatible with the rubber component, i.e., they are preferably substantially miscible in all proportions. Tackifiers used in the present invention preferably have a ring and ball softening point between about 70° C. and about 140° C. Illustrative examples of suitable tackifiers include the following types: rosin and rosin derivatives, $C_5$ and $C_9$ hydrocarbon resins, and terpenes and terpene phenolic derivatives. These may be used singly or in combination.

Typically, the adhesive composition comprises between about 125 and about 225 phr, preferably between about 150 and about 200 phr, of tackifier such that the adhesive is rendered relatively non-tacky. Adhesives used in this invention preferably contain sufficient tackifier to have, in a substantially uncured state, a Rolling Ball Tack, determined according to the test described below, of at least about 16 inches (40 centimeters). Adhesive compositions which contain insufficient amounts of tackifier typically tend to exhibit lower impact shear resistance and may tend to be displaced from the substrate upon multiple shearing impacts. Adhesive compositions which contain excessive amounts of tackifier typically tend to be more difficult to bond to a substrate and may be more likely to undergo brittle failure and pop off the substrate, especially at low temperatures. Optimum tackifier loading is dependent upon the softening point of tackifier; relatively low softening point tackifiers being less effective than relatively high softening point tackifiers in reinforcing the adhesive at equal tackifier loading levels.

We have also discovered that at a specified level of tackifier loading, an increased degree of crosslinking or cure of the adhesive tends to increase the impact shear resistance of the resultant pavement marking material. The degree of crosslinking through the adhesive layer, i.e., from substrate surface to backing layer, may be substantially uniform or the adhesive layer may have a differentiated crosslinking profile. Adhesives of the invention may be crosslinked via use of chemical crosslinkers, thermal crosslinkers, or actinic radiation, e.g., electron beam or e-beam exposure. The adhesive layer should be sufficiently cured to withstand 24 hours submersion in toluene substantially without dissolving. Adhesives which are insufficiently crosslinked may tend to exhibit low impact shear resistance. Adhesives which are very highly crosslinked may tend to be more difficult to bond to a substrate and be more likely to undergo brittle failure and pop off a substrate, especially at low temperatures such as are encountered during winter months.

The portion of the adhesive layer which is to be applied to the substrate, i.e., bottom portion of the adhesive, preferably has a Static Shear, determined according to the test described below, of between about 200 and about 2000 seconds.

Typically, a primer composition such as a contact cement will be applied to surface to which pavement markings of the invention are to be adhered. Primers improve the bond making performance of the adhesive, and in some instances may be necessary to attain a bond, such as where the adhesive contains particularly high tackifier loadings and/or is very highly crosslinked. Primers used with pavement markings of the invention preferably form hard coatings. For instance, a preferred class of primers are neoprene-based contact cements which form hard, water-resistant coatings.

The surface to which a pavement marking of the invention, and primer, if any, is applied is preferably substantially dry to ensure effective bonding. If primer is used, it is preferably applied thickly enough to provide an essentially continuous coating over the pavement surface, and more preferably, thickly enough to provide a somewhat more planar surface to increase the degree of contact with the bottom surface of the adhesive layer, particularly if the pavement marking is of relatively stiff, less conformable construction. The pavement marking is preferably applied to the primed surface during the open time of the primer.

The adhesive may also comprise one or more of the following: reinforcing agent, e.g., carbon black or other particulate materials, antioxidant, or processing aids, e.g., lubricants, peptizers, etc.

The adhesive and the layer which it is in contact with, either top layer 12 or optional base sheet 14, should be selected such that they bond strongly enough together to resist delamination under conditions to which the pavement marking is exposed.

Top layer 12 is typically a flexible polymeric layer which is preferably durable and wear-resistant. Illustrative examples of materials from which top layers may be made include polyvinyls, polyurethanes, epoxy resins, polyamides, polyureas, and polyesters. Mixtures of such materials may be used. Suitable polymeric materials may be either thermoplastic or thermosetting polymers.

In many embodiments, top layer 12 will also comprise a plurality of retroreflective particles 18 and/or skid-resistant particles 20 embedded in top layer 12 with some particles protruding from the top surface of top layer 12 as known to those skilled in the art. For instance, embodiments of the invention may be made with top layers containing skid-resistant particles as illustrated in U.S. Pat. No. 3,935,365 (Eigenmann).

Illustrative examples of retroreflective particles 18 which are suitable for use in pavement marking materials of the invention include glass microspheres having an index of refraction between about 1.5 and about 2.0, typically preferably between about 1.8 and about 1.95. Glass microspheres having an index of refraction closer to about 1.5 are typically less costly and more durable than those having higher indexes of refraction, whereas those having an index of refraction between about 1.8 and about 1.9 typically tend to provide high retroreflective efficiency. It will be understood by those skilled in the art that other embodiments of retroreflective particles 18 may be used in marking materials of the invention.

Skid resistant particles 20 are preferably used to impart greater frictional properties to the marking material. For example, skid resistant particles may be selected of proper type and sufficient quantity that the marking material has a skid resistance in the British Portable Skid Resistance Test of at least 50 BPN. BPN means the British Portable Number as measured using a Portable Skid Resistance Tester built by Road Research Laboratory, Crawthorne, Berkshire, England. White aluminum oxide granules are an illustrative example of suitable skid-resistance particles. Another illustrative example is ceramic spheroids that are a fired ceramic comprising a mineral particulate, alumina, and a binder.

In some embodiments, particles 18 and 20 may be treated with a coupling agent that improves adhesion between particles 18 and 20 and the polymeric components of top layer 12. Alternatively, a coupling agent may be incorporated in the composition from which top layer 12 is formed. Coupling agents typically comprise an inorganophilic portion, which associates with particles 18 and 20, and an organophilic portion, which associates with the organic components of top layer 12. Silane compounds, e.g., aminosilanes, are an illustrative example of typically suitable coupling agents.

Optional base sheet 14 is typically between about 0.8 and about 2 mils (20 and 50 microns) thick to impart desired conformability and strength to marking material 10. If base sheet 14 is too thin, it may not provide sufficient strength or support for marking material 10 to enable material 10 to be handled and applied to a roadway. If base sheet 14 is too thick, resultant marking material 10 may tend to stick up so far from the pavement to which it is applied as to be too readily subject to damage or dislodgment by snowplows.

Base sheet 14 and/or top layer 12 may also comprise particulate fillers to lower the cost as well as modify the properties, e.g., reinforcement, surface hardness, flexibility, etc., of base sheet 14, top layer 12, and overall marking material 10.

Optionally, coloring agents such as pigments may be added to base sheet 14 and/or top layer 12 to impart desired coloration. Illustrative examples of suitable coloring agents include titanium dioxide pigment which provides white color and lead chromate pigment which provides yellow color.

In other embodiments, pavement markings may be made using adhesive layers as described herein with top layers presenting reflective elements as disclosed in U.S. Pat. No. 3,587,415 (Eigenmann).

Typically, pavement markings of the invention will be wound into roll form for storage. Although relatively non-tacky, the adhesives of the invention will tend to develop a bond to the top of the pavement marking if wound into roll form and left for a time. Accordingly, a low adhesion backsizing or release agent, preferably non-migratory, should be applied to the top surface of the pavement marking backing before rolling.

EXAMPLES

The invention will be further explained by the following illustrative examples which are intended to be nonlimiting. Unless otherwise indicated, all amounts are expressed in parts by weight.

Unless otherwise indicated, the following test methods were used. Unless otherwise indicated, the tests were performed at room temperature.

Rolling Ball Tack

Rolling Ball Tack was determined by allowing a clean stainless steel ball weighing about 8.35 grams and having a diameter of about 0.5 inch (1.2 centimeters) to roll down a ramp with a 20° slope from a total vertical height of about 2.1 inches (5.3 centimeters) onto a horizontal layer of the subject adhesive. The distance from the end of the ramp to where the ball came to a stop was measured and reported as Rolling Ball Tack. This procedure is similar to Pressure Sensitive Tape Council Test Method PSTC-6.

Solvent Resistance

Solvent Resistance was determined by immersing a 1 inch (2.5 centimeter) square piece of the subject adhesive on polyester backing in toluene for 24 hours. After the 24 hours period, the samples were evaluated and reported as follows: 1) solution was cloudy and adhesive had dissolved—adhesive was substantially uncrosslinked; 2) solution was clear with some pieces of adhesive floating in it—adhesive was lightly crosslinked; and 3) solution was clear and adhesive appeared to be an intact film—adhesive was crosslinked.

Static Shear

Static Shear was determined by applying a 0.5 by 4 inch (1.2 by 10 centimeter) strip of a test tape comprising a 1 mil (25 micrometer) film of the subject adhesive on a 2 mil (50 micrometer) polyester terephthalate film to a stainless steel panel with a 0.5 by 0.5 inch (1.2 by 1.2 centimeter) portion of the tape in contact with the panel and the remainder extending beyond. The sample was laminated to the test panel by hand rolling with a 2 kilogram roller for six passes. The test panel was then suspended in a test stand at a 2° angle from vertical with the tape on the upper surface of the panel such that no gravity-induced peel force would be applied to the tape. After allowing the sample to equilibrate for 10 minutes at about 150° F. (65° C.), a 500 gram weight was suspended from the tape, using a hook that evenly distributed the weight across the full width of the sample. The sample was then allowed to remain at about 150° F. (65° C.) until the tape slid completely from the steel panel, with the elapsed time noted as Time-To-Fail. This procedure is similar to Pressure Sensitive Tape Council Test Method PSTC-7.

Impact Shear Resistance

Impact Shear Resistance was determined using a vehicle wear simulator designed to simulate shear and wear conditions experienced by a pavement marking located near an intersection. The simulator has a test area consisting of a horizontal annular ring about 6 feet (1.8 meters) in diameter and about 1 foot (0.3 meter) in width having an unprimed concrete surface. Samples of pavement marking material are cut into 2 by 6 inch (5 by 15 centimeter) rectangles and mounted in the annular ring with the long axis of the sample being aligned with the radial axis of the ring. Each sample is then rolled by hand with a rubber roller to provide good contact to the unprimed pavement surface and its initial position noted. Two tires, B. F. Goodrich P165/80R13 steel belted radials with an inflation pressure of 30 pounds/inch$^2$ ($2.1 \times 10^5$ Pascals), are positioned vertically above the test area at opposite ends of a rigid connecting frame. Downward pressure is applied to the connecting frame pneumatically to provide a load of between about 420 and about 440 pounds (about 190 and about 200 kilograms) on each tire. The frame is rotated, driving the tires across the surface of the test area at 60 revolutions/minute which is equivalent to a lineal tire speed of about 12.5 miles/hour (20 kilometers/hour), simulating the high impact shear and abrasion forces encountered at a highway intersection. Impact Shear Resistance was evaluated as the lateral movement of the sample on the substrate following a specified number of tire hits.

EXAMPLE 1

The effect of varying tackifier loadings at constant cure level is examined in Example 1.

A millbase adhesive composition was made by mixing the following components together with high shear rubber compounding equipment:

| Amount | Component |
|---|---|
| 80 | Polybutadiene rubber - 220 TAKTENE from Polysar; |
| 20 | Styrene butadiene rubber - STEREON 720A from Firestone Synthetic Rubber Company; |
| 30 | Carbon black pigment - STATEX 550 CBL from Columbian Carbon Company. |

The millbase was dissolved at 30 weight percent solids in toluene. Four adhesive compositions were prepared by adding the indicated amounts of a tackifier mixture (30 weight percent solids in toluene) of PICCOLYTE A135, alpha-pinene resin from Hercules, and ESCOREZ 1102, a C$_5$ hydrocarbon resin from Exxon (tackifiers in a 80/20 weight ratio) to millbase at the following levels:

| Sample | Tackifier Loading (phr) |
|---|---|
| A | 100 |
| B | 125 |

-continued

| Sample | Tackifier Loading (phr) |
|---|---|
| C | 150 |
| D | 175 |

Each adhesive composition was then coated onto a release liner and dried to yield a 1 mil (25 micrometer) thick film of adhesive on the liner. Sections of each adhesive were irradiated with an electron beam ("e-beam") so that sections of each adhesive received exposures of 2, 4, 7, 10, and 15 megarads ("Mrads") at 175 kilovolts, respectively. Composite 5 mil (125 micrometer) adhesive films at each tackifier loading were then constructed by laminating sections of adhesive together with the sections in order of increasing e-beam exposure. The composite adhesive films were then laminated to pavement marking backing material, comprising a urethane top layer and a highly filled acrylonitrile rubber base sheet, with the 15 Mrad layer against the backing material to yield a pavement marking tape.

Three samples of each construction were tested and yielded the average Impact Shear results shown in Table I (movement of marking in millimeters).

TABLE I

| Sample | Tackifier[1] | Hits[2] | | | | | |
|---|---|---|---|---|---|---|---|
| | | 10 | 31 | 64 | 90 | 118 | 160 |
| A | 100 | 9 | 46 | 76 | 105 | TH[3] | TH[3] |
| B | 125 | 5 | 24 | 44 | 55 | 73 | 79 |
| C | 150 | 3 | 8 | 17 | 28 | 42 | 51 |
| D | 175 | 2 | 5 | 7 | 10 | 14 | 17 |

[1]Tackifier loading in phr.
[2]Hits on vehicle wear simulator in thousands, results shown in millimeters.
[3]Test halted because samples had moved out of the wheel track or had failed completely.

These results illustrate that increasing the amount of tackifier over the indicated range provided an increase in impact shear resistance. The adhesive films in this Example and a number of the subsequent Examples were prepared by laminating separate 1 mil (25 micrometer) layers of adhesive together to quantify effects of individual levels of crosslinking. As will be understood by those skilled in the art, thicker adhesive layers can be coated and cured to various uniform or differentiated cure profiles.

The Rolling Ball Tack of each of these adhesives was over 16 inches (41 centimeters).

EXAMPLE 2

The effect of varying cure levels at constant tackifier loading is examined in Example 2.

An adhesive composition comprising 125 phr of tackifier was made as in Example 1. A 1 mil (25 micrometer) thick film was made and exposed to e-beam radiation as in Example 1. Adhesive film composites, 5 mils (125 micrometers) thick, with varying cure profiles were assembled and laminated to pavement marking backing similarly as in Example 1.

The cure profile of the adhesive film composites, i.e., exposure in Mrads of each layer, were as follows:

| Sample | Profile |
|---|---|
| E | 15/10/7/4/2 |
| F | 15/10/10/7/4 |
| G | 15/15/10/7/7 |
| H | 15/15/15/10/10. |

Samples of each construction were tested and yielded the average Impact Shear results shown in Table II (movement in millimeters).

TABLE II

| Hits[1] | Sample | | | |
|---|---|---|---|---|
| | E | F | G | H |
| 10 | 5 | 0 | 0 | 0 |
| 31 | 24 | 0 | 0 | 0 |
| 64 | 44 | 0 | 0 | 0 |
| 90 | 55 | 1 | 0 | 0 |
| 120 | 73 | 2 | 0 | 0 |
| 150 | 79 | 4 | 0 | 0 |
| 180 | TH[2] | 5 | 0 | 0 |
| 218 | TH[2] | 7 | 0 | 0 |
| 250 | TH[2] | 15 | 1 | 0 |
| 300 | TH[2] | 19 | 2 | 0 |
| 350 | TH[2] | 29 | 2 | 1 |
| 400 | TH[2] | TH[2] | 4 | 1 |
| 450 | TH[2] | TH[2] | 4 | 1 |
| 500 | TH[2] | TH[2] | 5 | 1 |

[1]Hits on vehicle wear simulator in thousands.
[2]Test halted because samples had moved out of the wheel track or had failed completely.

These results illustrate that increasing the amount of cure at the surface of the adhesive in contact with the substrate over the indicated range provided an increase in impact shear resistance.

The Rolling Ball Tack of each of these adhesives was over 16 inches (41 centimeters).

EXAMPLE 3

The effects of varying tackifier loadings and cure levels are examined in Example 3.

Four 5 mil (125 micrometer) adhesive composite films were prepared as in Examples 1 and 2 with the following tackifier loadings and cure profiles:

| Sample | Tackifier[1] | Cure Profile[2] |
|---|---|---|
| I | 125 | 15/10/10/7/4 |
| J | 175 | 15/10/10/7/4 |
| K | 125 | 15/15/10/7/7 |
| L | 175 | 15/15/10/7/7 |

[1]Tackifier loading in phr.
[2]Mrad.

Samples of each construction were tested and yielded the average Impact Shear results shown in Table III (movement in millimeters).

TABLE III

| Hits[1] | Sample | | | |
|---|---|---|---|---|
| | I | J | K | L |
| 10 | 0 | 0 | 0 | 0 |
| 31 | 0 | 0 | 0 | 0 |
| 64 | 0 | 0 | 0 | 0 |
| 90 | 1 | 0 | 0 | 0 |
| 120 | 2 | 0 | 0 | 0 |
| 150 | 4 | 0 | 0 | 0 |
| 180 | 5 | 0 | 0 | 0 |
| 218 | 7 | 0 | 0 | 0 |
| 250 | 15 | 0 | 1 | 0 |
| 300 | 19 | 1 | 2 | 0 |
| 350 | 29 | 1 | 2 | 0 |
| 400 | TH[2] | 1 | 3 | 0 |
| 450 | TH[2] | 1 | 4 | 0 |
| 500 | TH[2] | 1 | 5 | 0 |

[1]Hits on vehicle wear simulator in thousands.
[2]Test halted because samples had moved out of the wheel track or had failed completely.

These results illustrate improvement in impact shear by increasing tackifier loading from 125 phr to 175 phr and by increasing cure level of the bottom, i.e., pavement-contacting, surface of the adhesive.

EXAMPLE 4

The performance of pavement markings wherein the adhesive has different, uniform cure properties at constant tackifier loadings are examined in Example 4.

Four 5 mil (125 micrometer) adhesive composite films were prepared as in Examples 1 and 2 with 150 phr tackifier loading and uniform cure profile as follows:

| Sample | Cure (Mrad) |
|---|---|
| M | 4 |
| N | 7 |
| O | 10 |
| P | 15 |

Three samples of each construction were tested and yielded the average Impact Shear results shown in Table IV (movement in millimeters).

TABLE IV

| Hits[1] | Sample | | | |
|---|---|---|---|---|
| | M | N | O | P |
| 10 | 0 | 0 | 0 | 0 |
| 31 | 0 | 0 | 0 | 0 |
| 64 | 0 | 0 | 0 | 0 |
| 90 | 0 | 0 | 0 | 0 |
| 120 | 0 | 0 | 0 | 0 |
| 150 | 1 | 0 | 0 | 0 |
| 180 | 2 | 0 | 0 | 0 |
| 218 | 3 | 0 | 0 | 0 |
| 250 | 5 | 0 | 0 | 0 |
| 300 | 13 | 0 | 0 | 0 |
| 350 | TH[2] | 0 | 0 | 0 |
| 400 | TH[2] | 0 | 0 | 0 |
| 450 | TH[2] | 0 | 0 | 0 |
| 500 | TH[2] | 1 | 0 | 0 |

[1]Hits on vehicle wear simulator in thousands.
[2]Test halted because samples had moved out of the wheel track or had failed completely.

These results illustrate that advantages of the invention may be obtained with adhesives which have a uniform rather than differential cure.

The Rolling Ball Tack of each of these adhesives was over 16 inches (41 centimeters).

When tested for solvent resistance, the adhesive composite film of Sample M was found to have remained substantially intact with small chunks floating free in the toluene. The adhesive composite films of Samples N, O, and P were found to be essentially insoluble, with the toluene remaining clear. A sample of similar composition which had received a 2 Mrad e-beam exposure dissolved completely leaving a cloudy toluene solution.

EXAMPLE 5

Adhesion to a concrete substrate was evaluated by measuring the perpendicular peel force required to remove pavement markings from a concrete surface. The peel rate was 5 inches/minute (12.7 centimeters/minute) and the peel forces were recorded.

Two 5 mil (125 micrometer) adhesive composites were prepared with a tackifier loading of 175 phr and uniform e-beam exposures of 4 and 15 Mrad and laminated pavement marking backing as in Example 4.

The resultant pavement markings were then applied to weathered concrete substrate and tamped in place using a 3M Roller Tamper Cart Model RTC-2 loaded with 200 pounds (91 kilograms). Samples were applied directly to the unprimed concrete surface and others were applied after priming the substrate with STAMARK Brand E44 Contact Cement, neoprene contact cement from 3M, applied with a paint roller having a 1 inch (2.5 centimeter) nap. The primer was allowed to dry for 10 minutes at room temperature before application of the sample pavement marking thereto.

Perpendicular peel forces were measured after 1 hour and 24 hour residence times and were as shown in Table V.

TABLE V

| Sample | Cure[1] | Unprimed[2] | | Primed[2] | |
|---|---|---|---|---|---|
| | | 1 hour | 24 hour | 1 hour | 24 hour |
| Q | 4 | 5.1 | 5.4 | 7.0 | 10.5 |
| R | 15 | 4.0 | 4.2 | 29.8 | 29.8 |

[1]In Mrad.
[2]Perpendicular peel force in Newtons/centimeter-width at removal speed of 12.7 centimeters/minute after the indicated residence time.

These results show that the less highly cured adhesive established a somewhat stronger bond than did the more highly cured adhesive without the use of a primer. Use of a primer provided a dramatic increase in adhesion performance to both adhesives.

EXAMPLE 6

The effects upon static shear of adhesives having varying tackifier loading and cure levels is examined in Example 6.

The static shear results of adhesives having the indicated tackifier loading and uniform cure level were as follows (time-to-fail reported in seconds):

| Cure[1] | Tackifier Loading[2] | | | |
|---|---|---|---|---|
| | 100 | 125 | 150 | 175 |
| 2 | 100 | 42 | 20 | 20 |
| 4 | 1105 | 665 | 325 | 385 |
| 7 | 4050 | 1440 | 1865 | 1705 |
| 10 | TH[3] | 8770 | 3515 | 3645 |
| 15 | TH[3] | TH[3] | 10,740 | 2055 |

[1] In Mrad.
[2] In phr.
[3] Test halted after 61,000 seconds with no failure.

The adhesives exposed to 2 and 4 Mrads of e-beam radiation failed substantially cohesively. The adhesives exposed to 10 and 15 Mrads of e-beam exposure appeared to have popped off the panel due to a poor initial bonding rather than shear-induced cohesive failure. The adhesives exposed to 7 Mrads of e-beam exposure appeared to fail through a combination of these modes.

These results illustrate reduction in static shear strength by increasing tackifier loading from 125 phr to 175 phr and increase in static shear strength by increasing cure level from 2 to at least 7 Mrads. The apparent reduction in static shear between the adhesive containing 175 phr tackifier and 10 Mrad exposure and the adhesive containing 175 phr tackifier and 15 Mrad exposure is believed to actually be a result of poor initial bonding of the adhesive to the test panel masking a simultaneous increase in static shear strength.

Various modifications and alterations of this invention will become apparent to those skilled in the art without departing from the scope and spirit of this invention.

What is claimed is:

1. A pavement marking material comprising a top layer and a layer of adhesive, and an optional base sheet between said top layer and said layer of adhesive; wherein the improvement is that said adhesive comprises:

a) rubber having a glass transition temperature between about −120° C. and about −50° C.; and b) tackifier having a ring and ball softening point of between about 70° C. and about 140° C., said adhesive comprising between about 125 and about 225 parts by weight of said tackifier per 100 parts by weight of rubber;

wherein the Rolling Ball Tack of said adhesive in its uncured state is at least 16 inches and wherein said adhesive comprises 80 parts by weight polybutadiene rubber, 20 parts by weight styrene butadiene rubber, and 30 parts by weight carbon black.

2. The marking material of claim 1 wherein said adhesive comprises between about 150 and about 200 parts by weight of said tackifier per 100 parts by weight of rubber.

3. The marking material of claim 1 wherein said tackifier is selected from at least one of the following: terpenes and terpene phenolic derivatives, rosin and rosin derivatives, and $C_5$ and $C_9$ hydrocarbon resins.

4. The marking material of claim 1 wherein said tackifier consists essentially of a blend of alpha-pinene and a petroleum-based $C_5$ hydrocarbon.

5. The marking material of claim 1, said adhesive layer having a bottom portion which is to be applied to a substrate, wherein said bottom portion of said adhesive layer has a Static Shear of between 200 and 2000 seconds.

6. The marking material of claim 1 wherein said adhesive is sufficiently crosslinked so as to withstand immersion in toluene for 24 hours substantially without dissolving.

7. The marking material of claim 1 applied to a pavement surface having a layer of contact cement thereon.

8. The marking material of claim 1 wherein said tackifier results in a decrease in the static shear strength of said adhesive and an increase in the impact shear strength of said adhesive as compared to the properties of said rubber without said tackifier.

9. The marking material of claim 1 adhered to a pavement surface with said adhesive.

10. The marking material of claim 1 wherein said adhesive layer is crosslinked substantially uniformly.

11. The marking material of claim 1 wherein said adhesive layer is crosslinked nonuniformly such that the portion of said adhesive layer nearest said top layer has been crosslinked more extensively than the portion of said adhesive layer farthest from said top layer.

* * * * *